Figure 1:
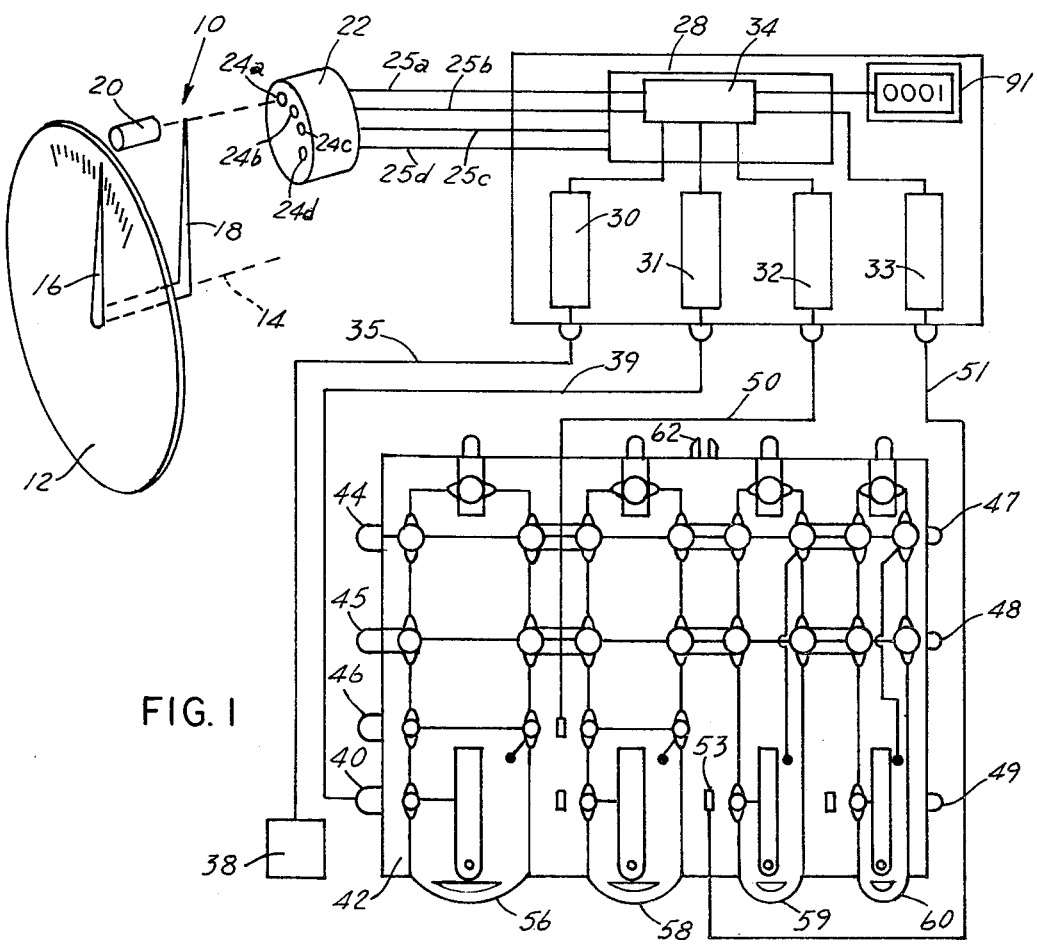

United States Patent [19]

Knox

[11] 4,189,706
[45] Feb. 19, 1980

[54] VEHICLE CONTROL FOR MULTIPLE SPEEDS

[76] Inventor: Knox, Leonard S., R.R. 1, Box 30, Maxwell, N. Mex. 87728

[21] Appl. No.: 883,571

[22] Filed: Mar. 6, 1978

[51] Int. Cl.$^2$ .............................. B60Q 1/54
[52] U.S. Cl. ........................ 340/53; 116/37; 180/171; 180/178; 307/10 R; 340/62
[58] Field of Search ............ 340/52 R, 53, 62; 307/10 R; 180/103 R, 105 E, 106, 110; 116/37, 57, 116, 280

[56] References Cited

U.S. PATENT DOCUMENTS

| | | | |
|---|---|---|---|
| 1,384,730 | 7/1921 | Crawford | 180/106 |
| 2,822,882 | 2/1958 | Campbell | 180/110 |
| 3,203,501 | 8/1965 | Carter et al. | 180/106 |
| 3,732,539 | 5/1973 | Easterly | 340/62 |
| 3,748,641 | 7/1973 | Hartung | 180/105 E X |
| 4,057,299 | 11/1977 | Jones | 340/53 X |

Primary Examiner—John W. Caldwell, Sr.
Assistant Examiner—Joseph E. Nowicki
Attorney, Agent, or Firm—Richard D. Law

[57] ABSTRACT

A multiple speed detection and control device for vehicles includes a speed detector associated with the vehicle speedometer arranged to sequentially detect multiple, predetermined, speed values, and an electric junction box connected in the major electrical lines of vehicle and connected with the speed detector, with the junction box having special fuses for the various electrical circuits, whereby the speed detector disrupts the fuses at the predetermined speeds to disrupt one or more of the electrical circuits to cause a particular failure of the electrical functions of the vehicle circuits, indicating speed above a predetermined speed, to an ultimate vehicle shut down above a maximum speed.

7 Claims, 7 Drawing Figures

VEHICLE CONTROL FOR MULTIPLE SPEEDS

PRIOR ART

As is well known, vehicular speed contributes greatly to frequency and severity of vehicular accidents. Speed indicator means have been proposed in a number of different devices, to aid law enforcement, and in controlling vehicular speed. However, control of such speeding is hampered by the great number of vehicles on the roads, the large number of roads, the mileage of such roads, and the lack of sufficient numbers of control officers to adequately patrol all roads, streets and highways.

In U.S. Pat. No. 1,437,714, there is provided an exterior signalling device which becomes visible when the vehicle exceeds determined speeds. The device is actuated by an air blower, and, further, includes tamper indicating means.

U.S. Pat. No. 2,258,369 discloses an adjustable speed indicator with an audible signal. The unit is activated by a photoelectric cell associated with a speed indicator. A very early speed indicator is shown in U.S. Pat. No. 1,442,937 mounted on the vehicle radiator, making it visible to persons outside of the vehicle. An indicator for speed displays different colors for different speeds in U.S. Pat. No. 3,952,689. These attempts at speed control do aid speed detection, when a control officer is present.

THE INVENTION

According to the present invention, there is provided an electrical circuit disruption system, based on predetermined speeds, to selectively disrupt electrical functions of the vehicle. Special spring loaded fuses are provided so that purchases of the same are controllable, and an automatic fine paid at the purchase time of the fuses. Further, for excessive speeds, the engine functions may be totally disrupted to prevent further operation of the vehicle until the fuse is replaced.

The unit is provided with multiple speed settings to cause specific effects at specific speeds. For example, at 3 miles an hour over the maximum speed limit (currently it is 55 mph by federal law) an audible signal is operated in the vehicle driver's compartment. At 5 mph over the maximum for a predetermined length of time, a fuse to the vehicle warning light system is broken causing the warning lights to blink continuously until the fuse is replaced. At 15 mph over for a predetermined time, the fuse for the right headlight is broken to make it blink during vehicle operation. Above 25 mph in excess of maximum legal speed for a predetermined time, the fuse to the engine ignition system is broken, to cause total loss of power of the vehicle engine until the fuse is replaced. The various speeds may be adjusted to fit the local laws and speed limits. Also, the fuses may be made of different size so as not to be interchangeable in the fuse box. All fuses are spring loaded and designed to prevent short circuiting and or jumping.

The system will relieve traffic control officers from most of the duties of monitoring vehicle speed. It will, also, eliminate a great percentage of offenders' appearances before a judge or magistrate, permitting such personnel to perform other functions. Very important is speeding information to all motorists on the highway, which is, of course, visible to all near the offending vehicle. The purchase of the fuses, with the appropriate fine, (by designated agents) provides uniform fines for each class of offender. Thus, the system will save lives, gasoline and oil, and property damage.

OBJECTS OF THE INVENTION

Included among the objects and advantages of the invention is to provide an automatic system of speed detection of a vehicle and control thereof.

Another object of the invention is to provide a detection means for vehicle speed and automatic disruption of selected electric functions of the vehicle, and means for assessing uniform monetary penalties for exceeding certain predetermined speeds.

Yet another object of the invention is to provide a changeable fuse system included in the electric systems of a vehicle to provide a fuse for specific electric circuits of the vehicle, and speed detecting means associated with the fuses to break the fuse of a circuit at selected speeds.

Still another object of the invention is to provide a method of monitoring and establishing excess speed of a vehicle by disrupting selected electric circuits of the electric system of the vehicle, and a method of uniform penalty assessment for excess speed by the purchase of electric line completion means.

An additional object of the invention is to provide fuses of different sizes to complete the circuits of different electrical functions of the electric systems of a vehicle, to prevent replacement of a fuse except by the correct size fuse.

A further object of the invention is to provide an interlocking system for a fuse set which is locked in position when the ignition key is removed.

GENERAL DESCRIPTION OF THE DRAWINGS

Figure 2:
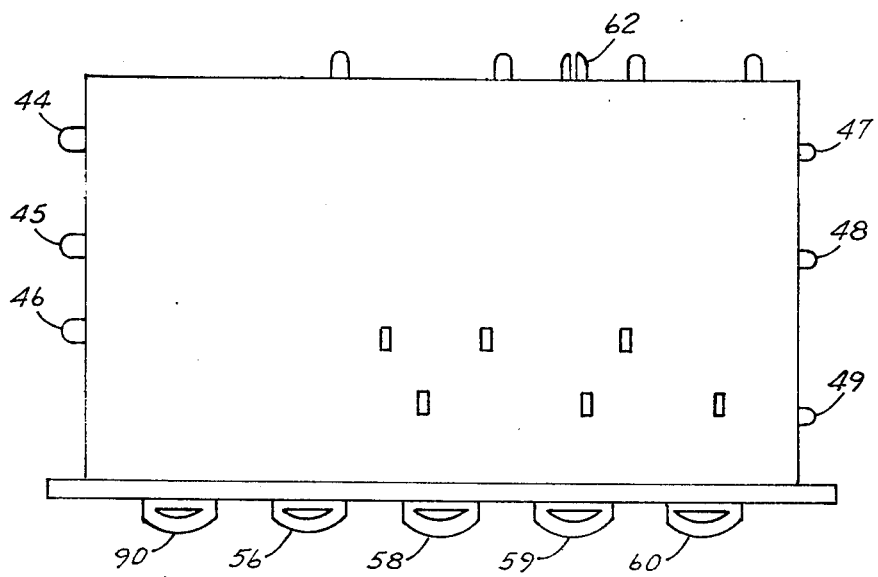
Figure 3:
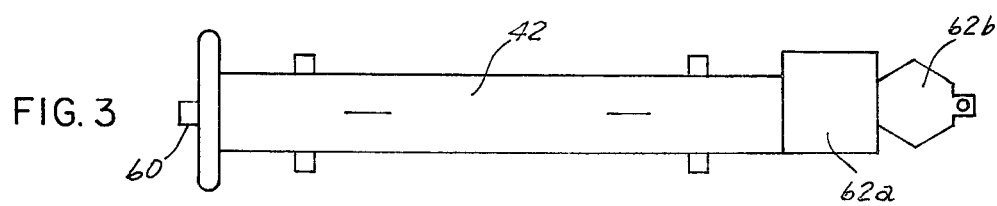
Figure 4:
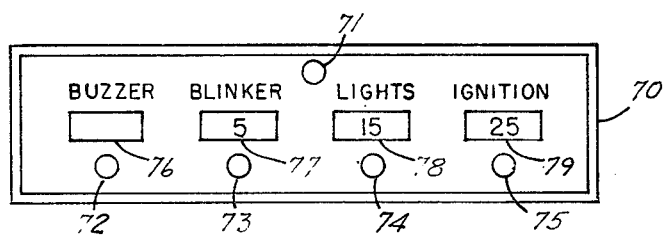
Figure 5:
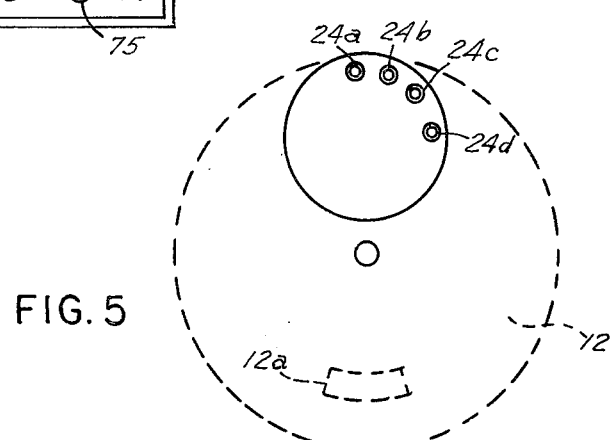
Figure 6:
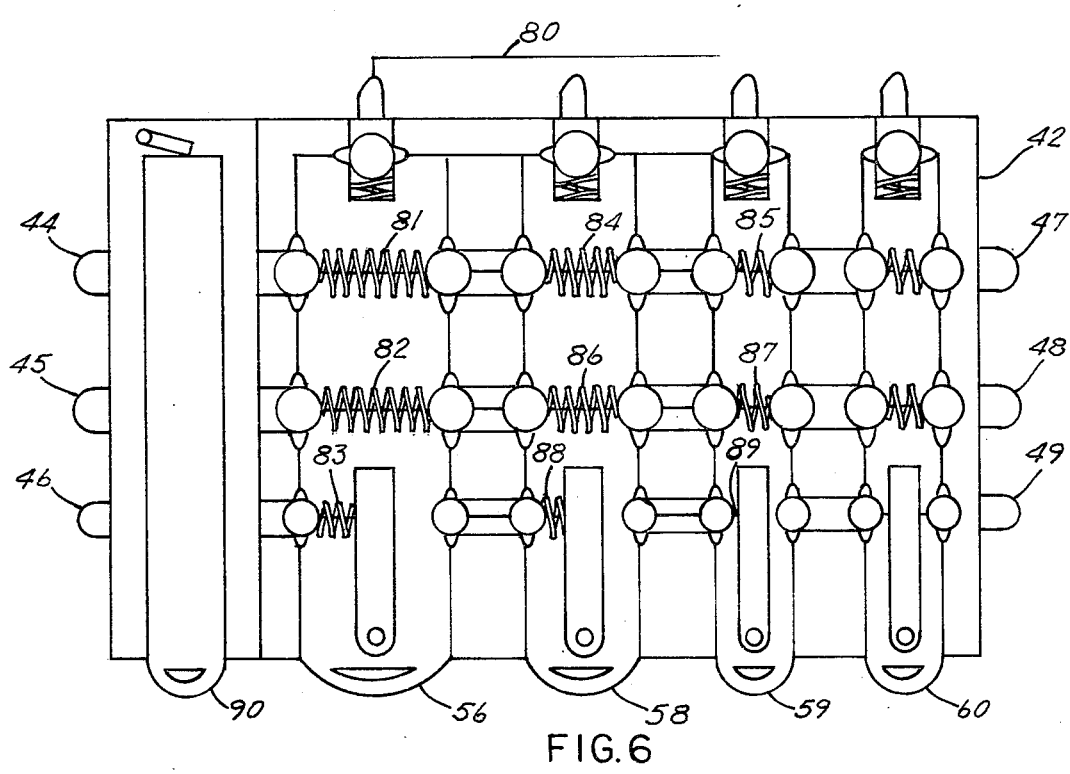
Figure 7:
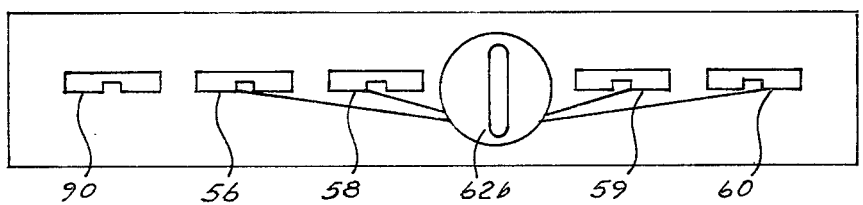

These and other objects of the invention may be readily ascertained by reference to the following description and appended drawings in which:

FIG. 1 is a stylized, schematic diagram of a unit or providing fuses in selected circuits of the electrical system of a vehicle, and means for detecting speed of the vehicle to actuate detection and control means for the speed of the vehicle, FIG. 2 is a top plan view of a fuse box according to the invention, FIG. 3 is a top elevational view of a fuse box mounted in a vehicle with the ignition key, FIG. 4 is a front elevation of an indicator panel showing the condition of various circuits of a vehicle system, FIG. 5 is a front elevational view of a speedometer detector disc, for actuating a detection and control system for the speed of a vehicle, FIG. 6 is a cutaway plan view of a fuse box with installed fuses and audible signal reset for the detection and control device of the invention, and FIG. 7 is a rear view of a fuse box showing the locking system of the invention.

In the device illustrated in FIG. 1 a speedometer arrangement, shown in general by numeral 10, of the vehicle includes the speedometer face 12 and a drive shaft 14, having an indicating needle 16 mounted adjacent the face 12. A second needle 18 is mounted on the shaft 14, behind the face, and a light source 20 is arranged to project a light to an electronic or photoelectric eye arrangement, 22 having receivers 24a, 24b, 24c and 24d, but the light sources are not indicated for clarity of the drawing. Electric leads 25, a, b, c and d extend to a transformer 28, that increases the photoelectric eye current output, causing the device of the invention to be activated and respond at different speed stages. Lines 25a and 25b pass through a two-way time switch mechanism 34 which will prevent the control systems from aborting and becoming operational, provided the operator reduces the vehicle speed within a predetermined time limit. Leads from the switch 34 pass through heat fuses 30, 31, 32 and 32a, a line 35 extends from the heat fuse 32 to an audible signal device, such as a buzzer 38 which is in the driver's compartment. Line 39 passes from the heat fuse 31 to a connector 40 into the speed control box 42. Electrical circuit connectors 45 and 46 provide connections to the wiring circuits of the vehicle at one side of the box and connectors 47, 48 and 49 at the opposite end, also, provide connections for circuits of the vehicle. A line 50 passes from the heat fuse 32 to the speed control box 42 and is connected to the circuits of the fuses, described below. A line 51 from the transformer, also, passes into the speed control box. This line includes a heat fuse 53 in the speed control box. A first stage fuse 56 is telescoped in an accommodating bore in the box, and a second stage fuse 58 is, likewise, mounted in the box in an accommodating bore. A third stage fuse 59 is mounted in the speed control box, and a final power fuse 60 is mounted in the speed control box. An ignition switch plug-in 62 is mounted on the speed control box, and is connected with the circuits to provide power to the unit when all the fuses are in operating order.

The condition of the unit is indicated in an indicator panel 70, FIG. 4, which includes an operations signal light 71, and fuse condition indicator lights 72, 73, 74 and 75. The lights 73, 74 and 75 are lighted when the fuse to which it is attached is blown. Indicator panels 77, 78 and 79 indicate when the miles base of a particular system has been exceeded, showing the number of miles per hour over the base of a predetermined speed limit, and indicating the circuit which is controlled by that number of miles over. Indicator panel 76 is a fuse used to re-set audible warning device 90 FIG. 6.

The fuse block 42, is shown in FIG. 6, showing four major fuses 56, 58, 59, 60 and audible reset device 90. A ground lead 80 provides a ground for each of the circuits that pass through the control box. Connectors 44, 45 and 46 provide an inlet for the hotline of the particular circuit. For example, the connector 44 provides the hot lead for the ignition wiring of the vehicle, the connector 45 provides the hotline for the headlight wiring system, and 46 provides a lead for the hotline of a functions system wiring. The connector 47 provides the connector for the ignition wiring from the control box, in a similar manner the connectors 48 and 49 provides leads for those particular circuits. The fuse 56 provides a heat breaking link 81 for the ignition line, a heat breaking link 82 for the light line, and a heat breaking 83 for the functional system wiring circuit of the vehicle. The fuse 58 includes a similar heat breaking link 85 to complete the circuit through the control box for the ignition line. The headlight line includes the link 82 fuse 58 includes link 86 and fuse 59 includes 87 to complete the circuit through the control box for the headlight circuit. The functional system wiring is open in each of the fuses until closed by breaking the fusible link, for example link 83 of the fuse 56 the link 88 of fuse 58 and the link 89 of the fuse 59.

The invention is arranged to provide different functions at different speeds, and the following explanation is set out for particular speeds, which may be changed to conform to local conditions or as desired. Assuming that the base speed, which is the maximum speed limit, is 55 mph, when a speed of 58–59 mph is reached the light breaking needle 18 breaks the light beam to the receiver 24a so that a current passes through the switch 34 to the audible signal 38 causing the buzzer to actuate. The buzzer will continue to buzz until the speed is reduced and the buzzer is reset. A continuation of the speed of the vehicle in the 58 to 59 mile an hour range will cause the heat fuse 31 to discharge breaking the link 82 on the fuse 56 causing a short in the vehicles warning light system. Since the fuse is broken, the short is permanent in the vehicle's warning light, and will continue to blink until the fuse 56 is replaced.

The warning buzzer is reset by withdrawing the buzzer reset fuse 90 a short distance and then reinserting it into the box. The buzzer will reset provided that the first stage heat fuse link 82 has not been shorted and burned out.

When the speed of the vehicle reaches 60 mph, and is maintained for a period of time exceeding the limit which is predetermined by the heat fuses, a permanent short is created in the first stage fuse 56, which causes the vehicle's warning light to blink until the fuse is replaced, or all of the power of the vehicle is turned off by the operator.

If the speed of the vehicle is maintained at 60 mph and the operator fails to reduce his speed, shut down the power, or to change broken fuses, after a predetermined time, there is a permanent shorting of the first stage heat fuse 83 which causes a direct short to the vehicle headlights circuit which causes them to continue blinking until both the first and second stage fuses are changed. Continual speeding or failure to change the first and second stage fuses 56 and 58 will cause the second stage fuse 58 to short, thus causing the third stage power fuse to short creating a loss of the power of the vehicle. The power loss will be continued until all three stages of fuses have been changed.

In the event that the vehicle speed exceeds 70 mph, and the operator fails to reduce the speed of the vehicle within the preset time of the heat fuses, the heat fuse 32 discharges and will cause a direct short in the second stage fuse 58 causing the headlights to blink continuously until the second stage fuse is replaced. Failure to change the fuse 58 or failure of the operator to shut off the power of the vehicle within the predetermined time or continued speeding will cause the heat fuse in the fuse 58 to discharge and create a direct short to the third stage fuse creating a loss of power of all electrical systems in the vehicle. The vehicle's power to the electrical systems can only be reactivated when the fuses are replaced, depending on the number of fuses blown.

If the speed of the vehicle attains 80 mph and is maintained for a period exceeding the predetermined time limit of the heat fuse (very short period for short bursts of speed), the heat fuse 32 discharges and a direct short in the third stage fuse 59 will occur causing loss of power to the vehicle. The power loss will remain until the shorted fuse 59 has been replaced.

Since the box is arranged in the electrical circuits of the vehicle, a disrupted or removed fuse turns off all of the electrical power in the vehicle systems so that the vehicle cannot be operated. Thus, removal of one fuse causes a failure of all electrical systems and the vehicle cannot be operated with one or more fuses removed. This provides a safety feature and a security feature which prevents vehicle operation in the event that the speed limit has been exceeded and a fuse has been blown, for example a fuse only to the headlights is blown the vehicle cannot be operated if the fuse is removed to prevent the blinking of the headlights. This provides for an automatic fine for a violation of the 60, 70, or 80 mile per hour speeds since the blowing of the fuse 56 is for the lower limit, the fuse 58 for the 70 mph and the fuse 59 for the 80 mph.

The unit is arranged for attaching to a steering column of a vehicle, and it may be designed so that a steering column lock is integrated with the unit. This can be arranged so that an operator can be prevented from using the vehicle if the speedometer cable is disconnected from the unit. Furthermore, the key may be arranged so that the vehicle engine may be run by turning the key in one direction which does not unlock the steering column, and provides means for working on or adjusting engine operation. In another method, if the speedometer cable is disconnected, the failure of the speedometer breaker needle to move within a predetermined time limit will result in a system abort, and resulting in a power loss to the vehicle. Such timing mechanisms are available, and are easily attached to the ignition circuit, which will activate and then blow the fuse, if the time exceeds the preset time with no movement of the breaker needle 18.

The switch arrangement 34 is a two way switch arranged to prevent the system from aborting and becoming operational, provided the operator reduces his speed within the predetermined time.

In the event a counter is desired to show the number of fuse activations, a counter 91, FIG. 1, may be added to be activated by the current from the time switch 34. This permits activation of the counter if the excess speed exceeds the time limit as set out by the switch mechanism.

While the invention has been described by means of specific examples, there is not intent to limit the invention; to be precise, embodiments set forth, and obvious modifications will be apparent to those skilled in the art without departing from the spirit and scope of the invention.

What is claimed is:

1. A multiple speed detection and control device for vehicles for a plurality of speeds from a predetermined minimum speed to a predetermined maximum speed comprising:
   (a) detection means for the speed of a vehicle to which the device is attached;
   (b) plural replaceable fuse means, each said fuse means associated with one of said plurality of speeds and being of a different size and being connected in a different electric circuit in the vehicle and not replaceable by one of the other fuse means;
   (c) timing means integrally connected between said detection means and each said fuse means, providing a predetermined time prior to the activation of the associated fuse for a particular speed, and,
   (d) each said fuse means on activation breaking the associated particular electric circuit of the vehicle, whereby when the vehicle speed in a predetermined speed range exceeds a particular speed for a predetermined time set by said timing means the associated circuit is deactivated.

2. Multiple speed detection and control device according to claim 1, wherein each said fuse is individually removable from an associated fuse box.

3. Multiple speed detection and control device according to claim 1, wherein said fuse means are interconnected so as to activate all such fuses when the predetermined maximum speed of the vehicle is exceeded for the predetermined time.

4. Multiple speed detection and control device according to claim 1, wherein each said fuse means is coded so as to indicate the excess speed above a certain speed.

5. Multiple speed detection and control device according to claim 1, wherein said detection means is interconnected with the speedometer of the vehicle.

6. Multiple speed detection and control device according to claim 1, wherein a photoelectric cell is arranged on the speedometer for each predetermined speed and a speed indicating pointer cuts light to each photoelectric in sequence from the minimum to the maximum predetermined speed.

7. Multiple speed detection and control device according to claim 1, wherein said plural fuse means is in a housing and are locked in said housing by an ignition lock of the vehicle.

* * * * *